(12) United States Patent
Mooney et al.

(10) Patent No.: US 8,251,018 B2
(45) Date of Patent: Aug. 28, 2012

(54) APPARATUS FOR USE WITH A SLATTED FLOOR

(76) Inventors: Patrick Roy Mooney, Terenure (IE); Anthony Dunne, Howth (IE); Martin McElligott, Swords (IE); Edward Howlin, Clane (IE); Stuart O'Hare, Tyrellstown (IE); Murtagh Logan, Prosperous (IE)

( * ) Notice: Subject to any disclaimer, the term of this patent is extended or adjusted under 35 U.S.C. 154(b) by 170 days.

(21) Appl. No.: 11/887,523

(22) PCT Filed: Mar. 29, 2006

(86) PCT No.: PCT/IB2006/000720
§ 371 (c)(1),
(2), (4) Date: Jan. 29, 2008

(87) PCT Pub. No.: WO2006/103534
PCT Pub. Date: Oct. 5, 2006

(65) Prior Publication Data
US 2009/0050070 A1    Feb. 26, 2009

(30) Foreign Application Priority Data

Mar. 29, 2005 (IE) .................. S2005/0168
Aug. 8, 2005 (IE) .................. S2005/0523

(51) Int. Cl.
*A01K 1/015* (2006.01)
(52) U.S. Cl. ......... 119/529; 119/526; 119/527; 119/528
(58) Field of Classification Search .......... 119/525–530;
A01K 1/00, 1/01, 1/15
See application file for complete search history.

(56) References Cited

U.S. PATENT DOCUMENTS

| 2,308,943 | A | * | 1/1943 | Tietig et al. ........................ 52/781 |
| 3,824,960 | A | * | 7/1974 | Kaltenbock .................... 119/528 |
| 3,837,319 | A | * | 9/1974 | Lehe .............................. 119/529 |
| 4,182,271 | A | * | 1/1980 | Dodge et al. .................. 119/528 |
| 5,351,458 | A |   | 10/1994 | Lehe |
| 5,456,209 | A | * | 10/1995 | Heinrich ........................ 119/450 |
| 5,813,365 | A | * | 9/1998 | Helmy ........................... 119/528 |
| 6,047,663 | A | * | 4/2000 | Moreau et al. ................. 119/529 |
| 7,007,437 | B2 | * | 3/2006 | Thomas ....................... 52/650.3 |
| 7,107,935 | B2 | * | 9/2006 | Mooney ........................ 119/529 |
| 7,353,776 | B2 | * | 4/2008 | Mooney ........................ 119/526 |
| 2007/0044727 | A1 | * | 3/2007 | Mooney ........................ 119/526 |

FOREIGN PATENT DOCUMENTS

| AT | 386243 | 7/1988 |
| DE | 19904010 | 8/1999 |
| EP | 81736 A1 * | 6/1983 |
| EP | 0609581 | 8/1994 |
| EP | 1336336 | 8/2003 |
| IE | 20000265 | 3/2001 |
| NL | 1003271 | 12/1997 |
| WO | WO0016611 | 3/2000 |

* cited by examiner

*Primary Examiner* — Kimberly Berona
*Assistant Examiner* — Marisa Conlon
(74) *Attorney, Agent, or Firm* — Hoffmann & Baron, LLP

(57) ABSTRACT

Apparatus for use with a slatted floor comprises a floor covering apparatus for placement on the individual slats of a slatted floor. Each floor covering apparatus includes an elongated elastomeric mat (410) adapted to be fitted to a floor slat. The mat has a rigid fixing base (411), a flexible core (11) and an outer skin (415). The rigid fixing base (411), the flexible core (11) and the outer skin (415) are integrally formed together. The mat has a longitudinal leg (413) at each side to locate the mat. Also a flap valve (412) is mounted on each leg and protrudes into the gap between adjacent slats.

22 Claims, 19 Drawing Sheets

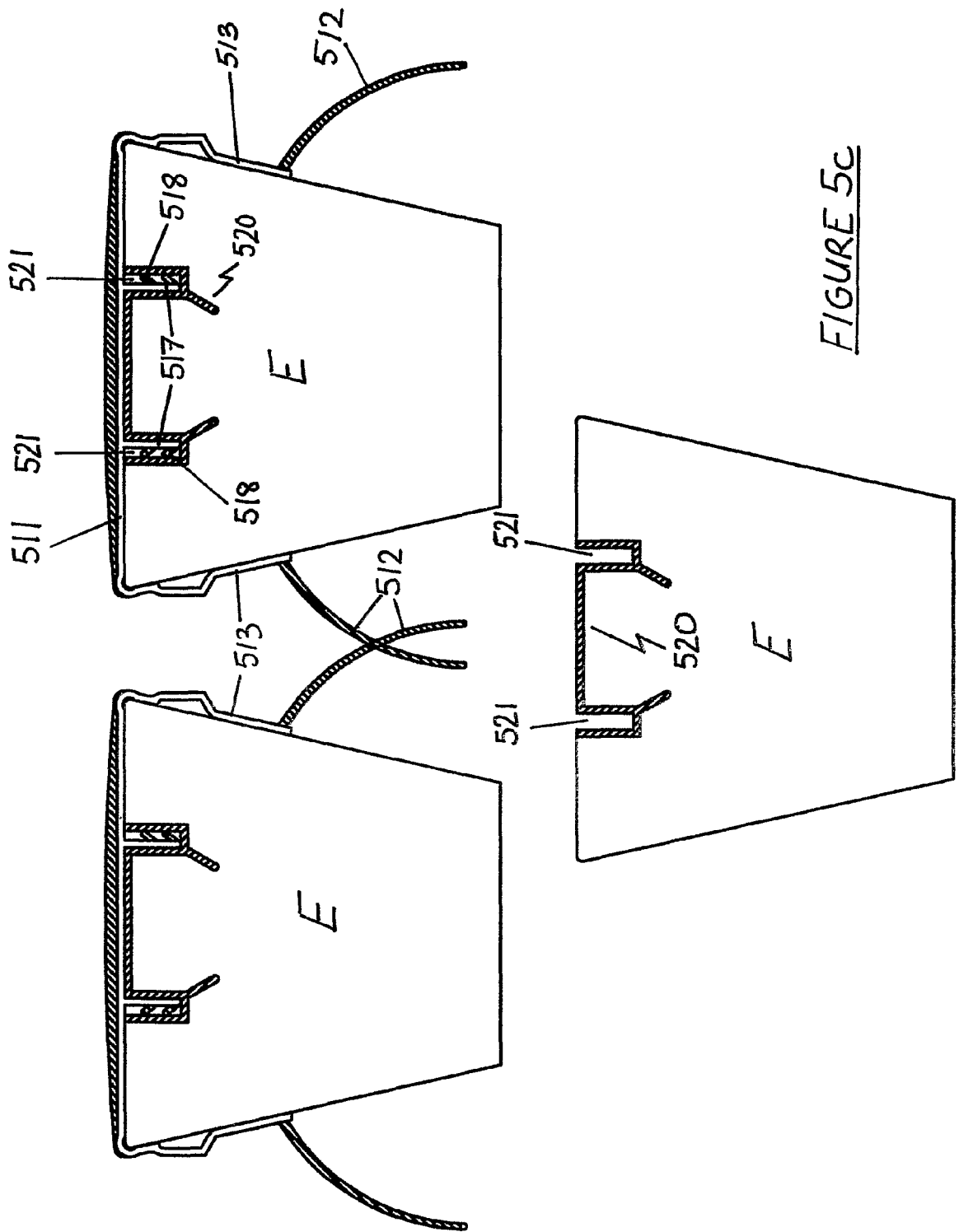

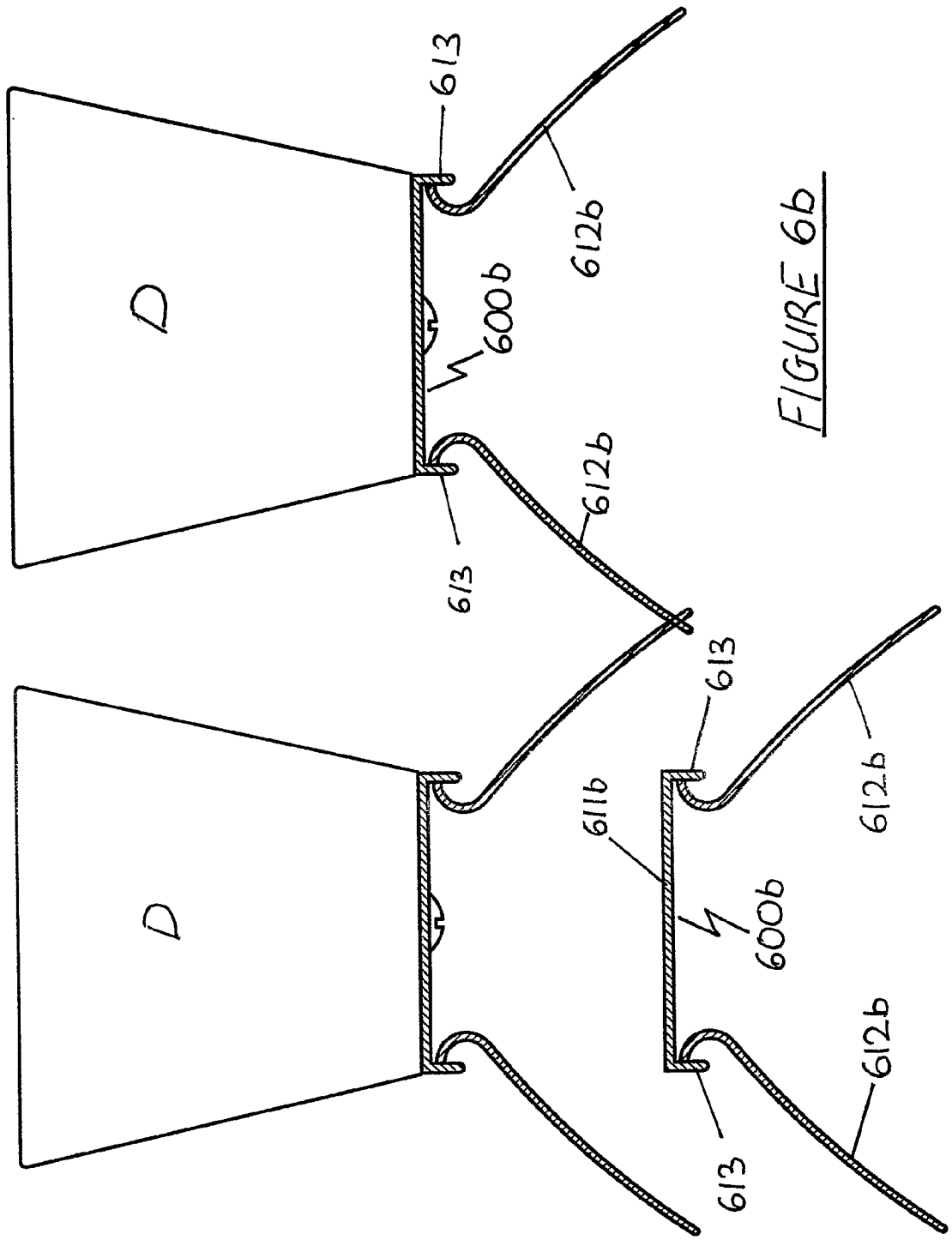

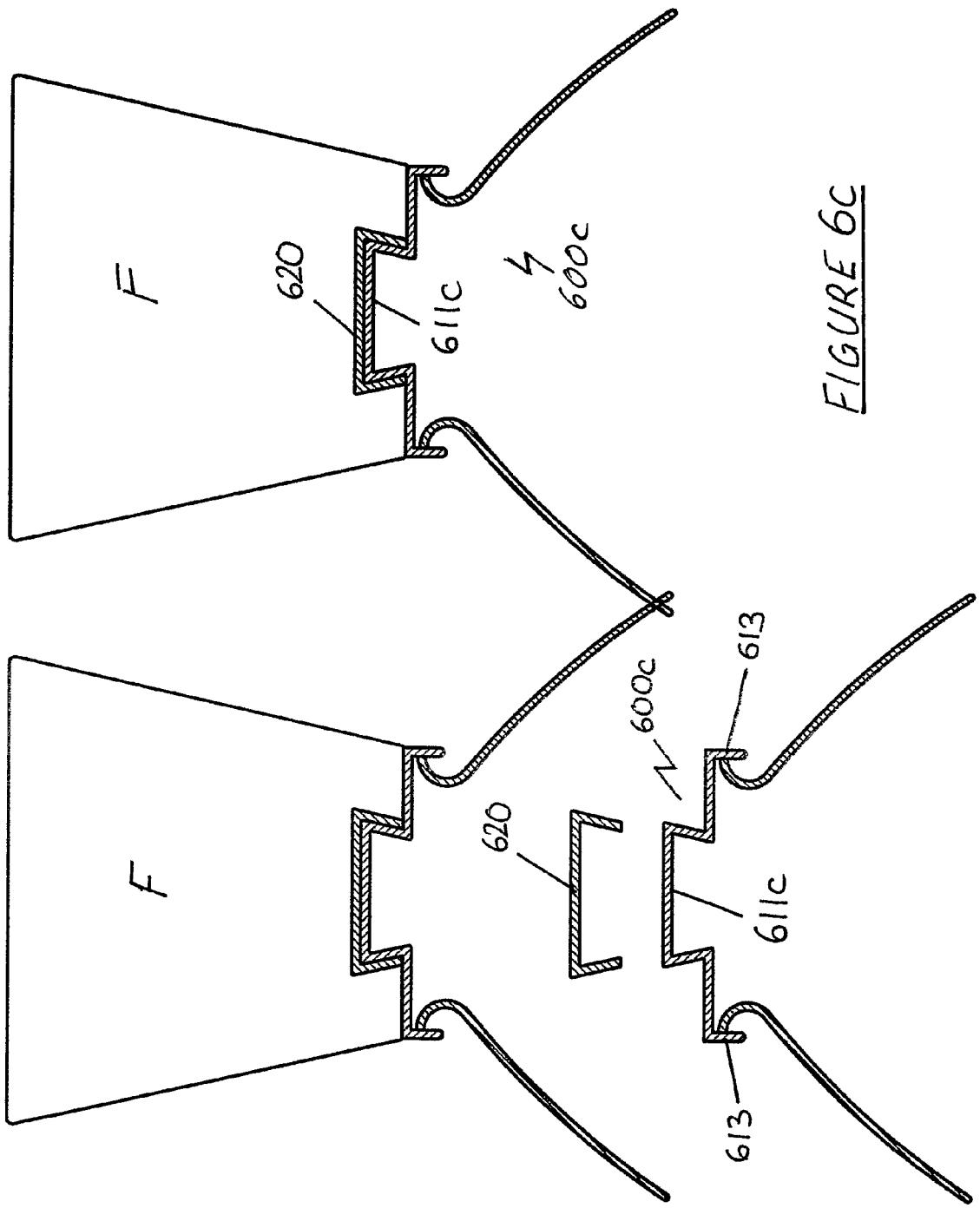

APPARATUS FOR USE WITH A SLATTED FLOOR

This application is the U.S. National Phase of, and Applicants claim priority from, International Application Number PCT/IB2006/000720 filed 29 Mar. 2006, Irish Application bearing Serial No. S2005/0168 filed 29 Mar. 2005 and Irish Application bearing Serial No. S2005/0523 filed 8 Aug. 2005, which are incorporated herein by reference.

BACKGROUND OF THE INVENTION

The invention relates to apparatus for use with a slatted floor and to a floor covering for placement on the individual slats of a slatted floor in an animal house for housing animals, such as but not exclusively bovines, pigs, sheep, deer and other animals which may be housed in buildings having slatted floors or kept on slatted floors located externally. The floor covering will be referred to in brief as a slat mat. The apparatus can be used with slats made from any material, for example concrete, metal, plastic or wood.

The invention relates to an improvement in the invention disclosed in International Patent Application No. PCT/EP 02/00274 dated Jan. 4, 2002 (Publication No. WO02/065831 A2) the contents of which are incorporated herein by reference. The floor covering of that apparatus comprises an elastomeric mat which is designed for cleanliness and enhanced protection and comfort for animals and includes an openable flap along both or one of the longitudinal edges of the mat to minimise the gap between adjacent slats of a slatted floor so as to reduce the emission of gases and fumes emanating from a waste collection tank beneath the floor while allowing waste matter to pass through the slatted floor to the tank.

The above mat is securable to an individual slat by screws which are securable in rigid strip(s) located at the base of the mat. While this method of securing a slat mat is very effective and strong, it is an object of the present invention to improve the method of installation.

Slatted floors are generally mounted over slurry collection tanks or floors that lead to slurry collection tanks which can hold slurry for prolonged periods of time. Therefore this leads to a major problem with the emission from the tanks of dangerous gases which would be injurious to the environment, and unpleasant odours from such tanks. This problem can give rise to difficulties for persons working in these areas and living adjacent to these areas and not to mention the animals themselves. In recent times pollution control authorities have begun to issue strict controls on these areas and to limit the number of animals which may be housed there. This obviously has large cost implications for the owners of such enclosures with regard to the numbers of livestock that can be housed.

A further object of the invention is to attempt to alleviate the problem of the emission of such gases and fumes and to reduce the upward air-drafts that the animals may be subjected to.

SUMMARY OF THE INVENTION

The present invention provides a floor covering apparatus for an animal house or location adapted to provide comfort and protection for animals, comprising an elongated elastomeric mat adapted to be fitted to a floor slat, the mat having a leg at each longitudinal side of the mat, each leg being adapted to extend into the gap between adjacent slats, the two legs of each mat serving to locate the mat.

Preferably, one or each leg of the mat is provided with gripping means to facilitate the gripping of the mat to the slat.

Even if the floor covering apparatus for fitting to a slatted floor does not have a cushion effect as outlined in the above specification, the fact that the rigid floor covering apparatus could contain any or all of the following features, means it could be considered as having 'comfort features':

a curved surface to promote the movement of animal urine and faeces to the slurry collection tank below and to reduce the retention of such waste materials on the mat surface.

a surface to reduce urine absorption into the slats, in particular concrete slats, and hence reduce slat degradation.

surface treatments that could include textured embossing or the addition of a further non-slip grip surface made from a material applied either in the form of a complete skin or in the form of beads or other similar textured features. The inclusion of such surface treatments would ideally contribute to improved durability and would also allow the application of biocide treatments for the added protection of the animals.

a mat sized to match the profile of the slats and having a surface to promote the transfer of the animal waste to the tank below, thereby improving the animal cleanliness and reducing the amount of materials that may cause gaseous emissions such as ammonia that would otherwise be retained on the slat.

plastics construction which would reduce damage to the slats and hence significantly reduce injuries caused to the animals.

the inclusion of a flap valve means to reduce gas emissions and unpleasant odours would also add to the animal welfare.

Conveniently, one or each leg of the floor covering apparatus has one or more elbows along its length to facilitate the gripping of the mat to the slat.

Advantageously, the floor covering apparatus is ideally suited to manufacture by co-extrusion whereby the apparatus is produced as having a unitary construction.

Preferably, a flap valve is provided at one or both sides of the slat mat, the flap valve or valves being adapted to protrude into the gap between adjacent slats. The flap valve(s) may be provided with a movement joint, whereby pressure on the upper surface of the mat by an animal standing or moving thereon ideally allows the flap valve to flex and move in the gap between the slats to permit animal waste to fall into a waste collection tank located underneath the slatted floor.

The term "flap valve" when used in this specification is not to be read merely to describe the device shown in the drawings but is meant to cover any device, mechanism or means which can restrict the gap between adjacent slats but still allows waste material to pass through the gap and can be manufactured from any material.

Alternatively, a flap valve is provided at one or both sides of the slat mat, the valve being adapted to protrude into the gap between adjacent slats at a level below the floor. As the flap valve rests below the floor surface, it is less likely to be damaged by the hooves or bodies of animals as they move about on the floor.

In one arrangement, the elastomeric mat is supported by a bed of rigid material, the bed comprising the legs and each leg being resiliently deformably biased to engage a slat. In another arrangement, the legs are formed integrally with the elastomeric mat.

The mat may conveniently be provided with formations located on one or more of its surfaces which, is use, are in contact with a slat. Said formations are adapted to resist slippage of the mat relative to the slat. Any anti-slip means are suitable for this purpose.

Conveniently, each leg is 10 mm or longer.

When a flap valve is provided at each side of the mat, the respective flap valves reduce the gap in the opening between adjacent slats by coming into proximity with each other.

These flaps may be of a single or multiple flap design or of a 'bubble' valve of a singular or multiple chamber type. They may be supplied as integral part of the mat or they may be provided as a separate component to be fixed to the vertical fixing legs on a locator provided on the mat, thereby allowing for the replacement of these flaps, without having to necessitate the replacement of the complete mat.

The invention also provides a floor covering apparatus ideally having a low-profile domed upper mat portion fixed to a bed of a material, ideally plastics, such that any waste matter deposited onto the floor covering apparatus will tend to move towards the flap valve provided at one or both sides.

The present invention also provides an apparatus adapted to be fitted to the underside of a mat or slat, the apparatus comprising an elongate member and having a flap valve extending laterally outwardly from at least one longitudinal edge.

The present invention further provides a flap valve for fitting to a slat, the valve formed from resilient and ideally high-slip or low friction material so that it may return after waste materials have passed through adjacent floor slats so that the emission of gases and odours from a collection tank below is reduced by the valve arrangement fitted to the floor.

The present invention also provides a slat provided with elongate grooves or channels which may either be pre-formed into or cut into the slat and adapted to receive complementary shaped anchoring formations provided on corresponding mats or flap valves.

The flap valve design is novel in that it is designed to be replaceable, so that it can be retrofitted as required without the need to change the complete floor covering which is provided with a rigid fixing means incorporated in the main profile or co-extruded with the main profile.

The flap valve may also be designed so that it comprises a special high slip surface to promote the transfer of the animal waste to a slurry collection tank below. Furthermore, the flap valve is made from a special elastomeric which ideally allows the valve to recover when the waste has passed through, thereby reducing the gas emissions and odours from the slurry collection tank.

The present invention provides a longitudinal elastomeric flap valve to be provided for inclusion in the main body on one or both sides of a slat, which may be made from concrete, metal, plastic or wood, the flap valve protruding into the gap between the adjacent slats. The flap valve may also be provided with a movement joint, whereby pressure on the flap by animal waste allows the flap valve to flex and move in the gap between the slats to permit the animal waste to fall into the collection tank located underneath the slatted floor and allows the flap valve to recover, thereby reducing the emission of hazardous gases and odours emanating from the tank.

The invention provides a floor covering apparatus for an animal house adopted to provide comfort and protection for animals, comprising an elongated profile adapted to be fitted to a floor slat, the profile having a leg on one or each longitudinal side of the profile, the or each leg being adapted to extend into the gap between adjacent slats, the or each leg serving to prevent lateral movement of the profile.

Preferably, a flap valve is provided at one or both sides of the slat mat, the flap valve or valves being adapted to protrude into the gap between adjacent slats. The flap valve(s) may be provided with a movement joint, whereby pressure on the upper surface by the animal waste, allows the flap valve to flex and move in the gap between the slats to permit the animal waste to fall into a waste collection tank located underneath the slatted floor and then to recover thereby reducing the gaseous emissions and odours emanating from the waste collection tank.

BRIEF DESCRIPTION OF THE DRAWINGS

The invention will hereinafter be more particularly described with reference to the accompanying drawings which show, by way of example only, a number of embodiments and modified embodiments of an apparatus according to the invention. In the drawings:

FIG. 1a is a cross-sectional side view of the mat of the first embodiment showing a leg in a relaxed position, i.e. not engaged in the gap between slats and not having a flap valve;

FIGS. 5c, 5d and 5e are cross-sectional views of a floor covering apparatus showing alternative means of connection to a slat;

DETAILED DESCRIPTION OF THE INVENTION

Figure 1:
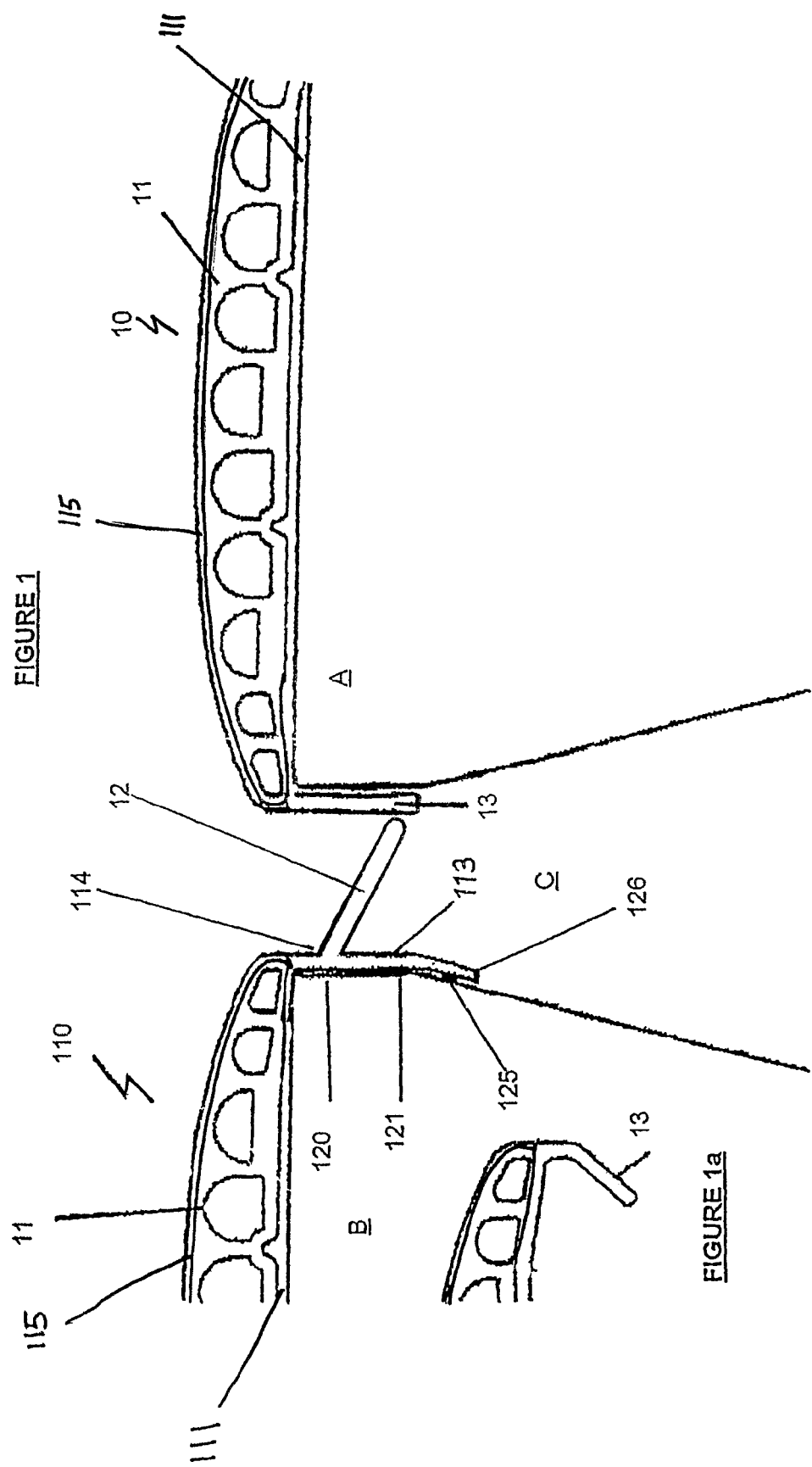
FIG. 1 is a cross-sectional side view through portions of two mats of first and second embodiments located respectively on two slats A and B.

Referring to the drawings and initially to FIGS. 1 and 1a, the first embodiment of floor covering apparatus comprises a mat 10 of elastomeric material ideally having an outer skin 115 and a flexible core 11 which are fixed to a rigid fixing base which comprises a bed 111 of a plastics material which has sufficient rigidity to support the flexible core 11 and the outer skin 115. The flexible core 11 may comprise a series of chambers or cavities similar to the construction described in detail in the above-mentioned PCT application. Each mat 10 has a leg 13 at each side and a separate flap valve or valves 12. The legs 13 sit down by the side of the slats A and B into gaps C formed between the two slats. Each of the legs 13 can be formed in the shape shown in FIG. 1a with a natural bias to grip the sides of the slats.

Figure 2:
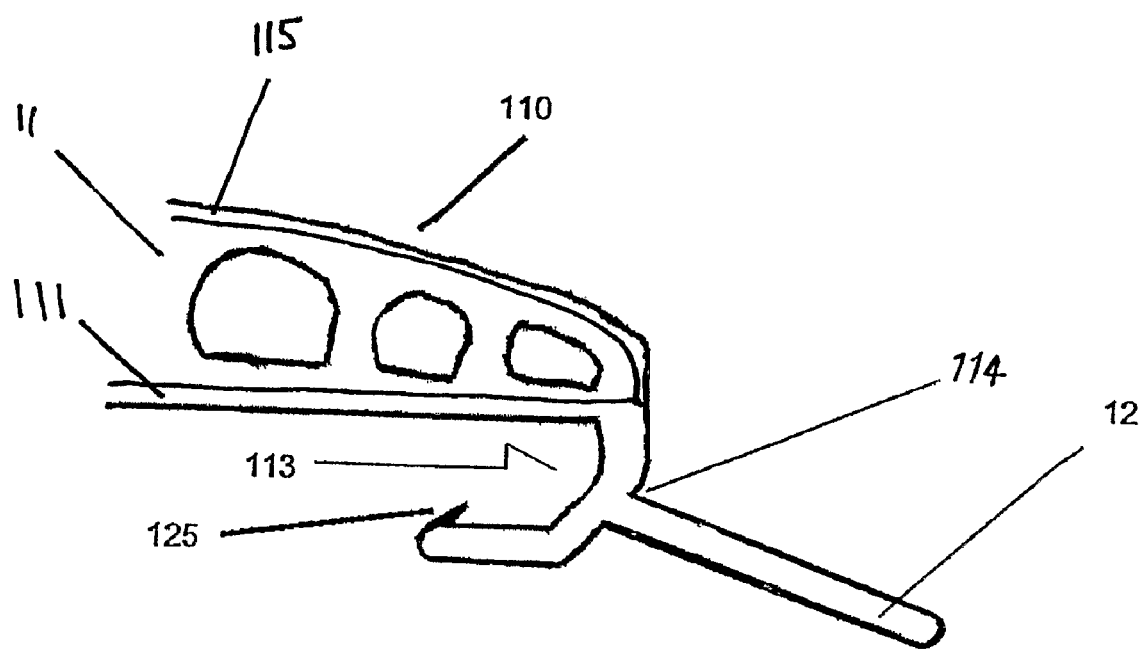
FIG. 2 is a cross-sectional side view of the mat of the second embodiment showing a leg in a relaxed position.

The second embodiment of mat 110 is also shown in FIGS. 1 and 2 and is similar in most respects to the first embodiment 10. However the legs of the mat 110, only one of which 113 is shown in the drawings, are different. The leg 113 is shaped or designed to facilitate its conforming with the shape of the slat and has a grip 125 at the end 126 of the leg 113, thereby enabling the leg to conform with the slat and grip it to help prevent the mat 110 from lifting. A movement joint 114 is provided between the mat 110 and the flap valve 12 so that pressure on the upper surface of the mat 110 by animals standing or moving on the upper surface may allow the flap valve 12 to move.

Figure 3:
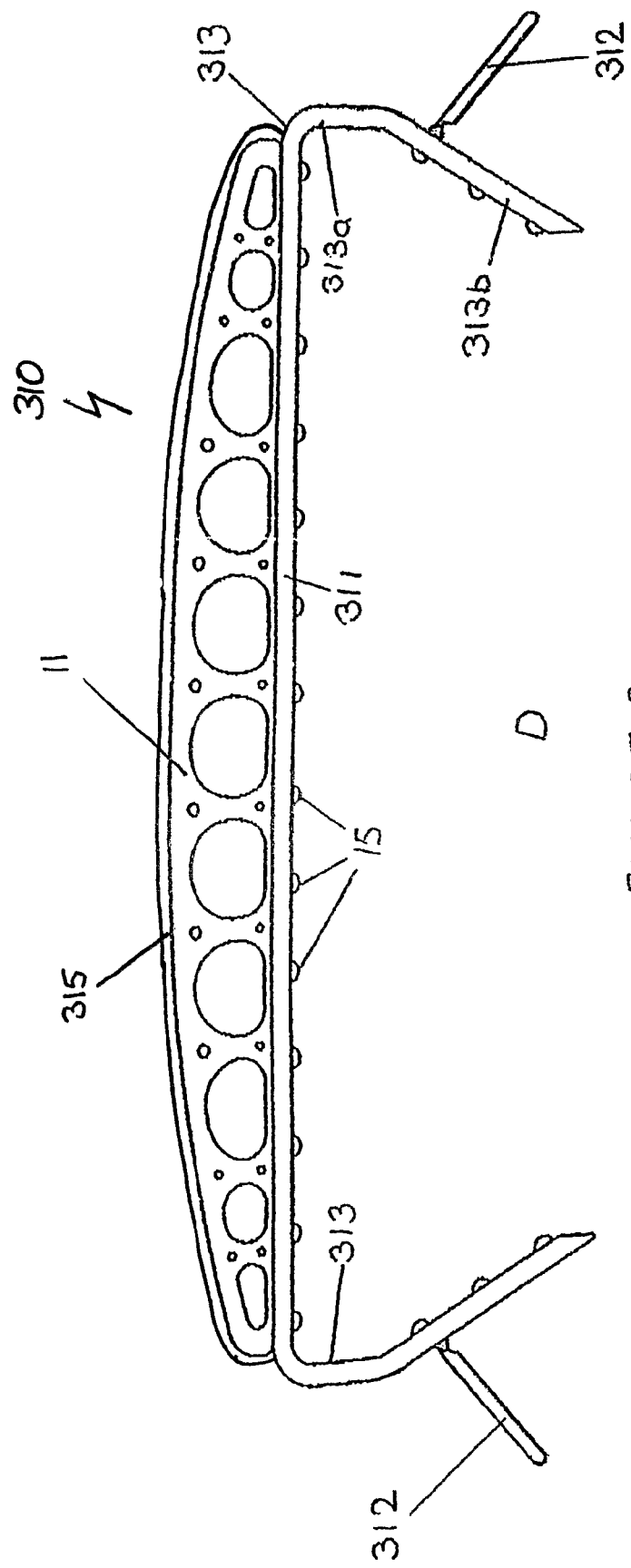
FIG. 3 is a cross-sectional side view of the mat of a third embodiment showing the legs in the position that they would assume when fitted in a grip position on the slat and also showing flap valves fitted to both sides of the mat.

Referring to FIG. 3, a third embodiment of a floor covering apparatus comprises a mat 310 of elastomeric material having an outer skin 315 and an flexible core 11 which are fixed to a rigid fixing base which comprises a bed 311 of a plastics material which has sufficient rigidity to support the flexible core 11 and the outer skin 315 and has sufficient resilient deformability to enable it to clip or grip against slat D. The flexible core 11 may comprise a series of chambers or cavities. Bed 311 includes a pair of laterally depending legs 313. The lower portions 313b of each of the pair of legs are biased mutually inwardly to engage the walls of the slat D and to hold the mat 310 firmly in place on the slat. A flap valve 312 is provided as an integral component of the mat, extending laterally outwardly from each leg 313. Ideally, the flap valve 312 is provided on the upper portion 313a of the leg and is positioned thereon at a point below the upper surface of the slat D. In this way, the flap valve is sunk below the surface of the slatted floor, reducing the likelihood of the valve being damaged by the animals.

Two mutually adjacent flap valves 312 of adjacent mats may overlap in the gap between two adjacent slats or the flap valves may meet end to end.

Figure 4A:
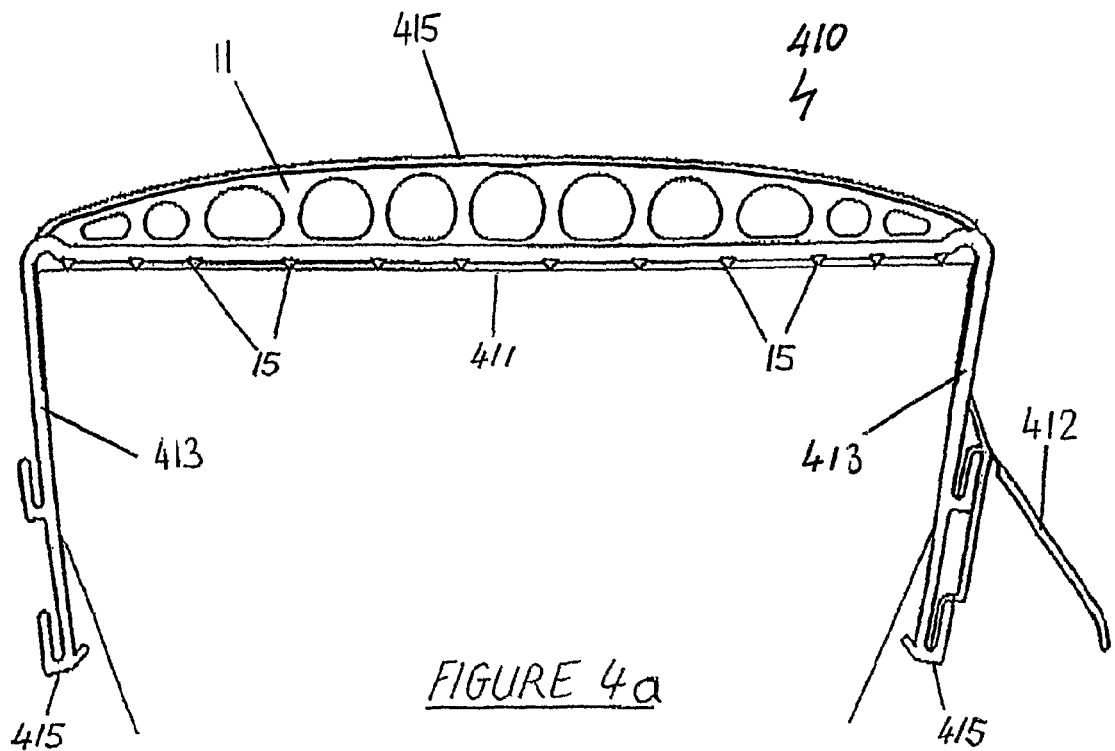
FIGS. 4a, 4b and 4c are cross-sectional side views of a mat of a fourth embodiment showing the legs in the position that they would assume, when fitted in a grip position on the slat. The flaps are shown as a separate-fit and retro-fit components, the design of which maybe either as a single or multiple flap (FIGS. 4a and 4c) or as a single or multiple chamber 'bubble' valve flap as illustrated (FIG. 4b)
Figure 4B:
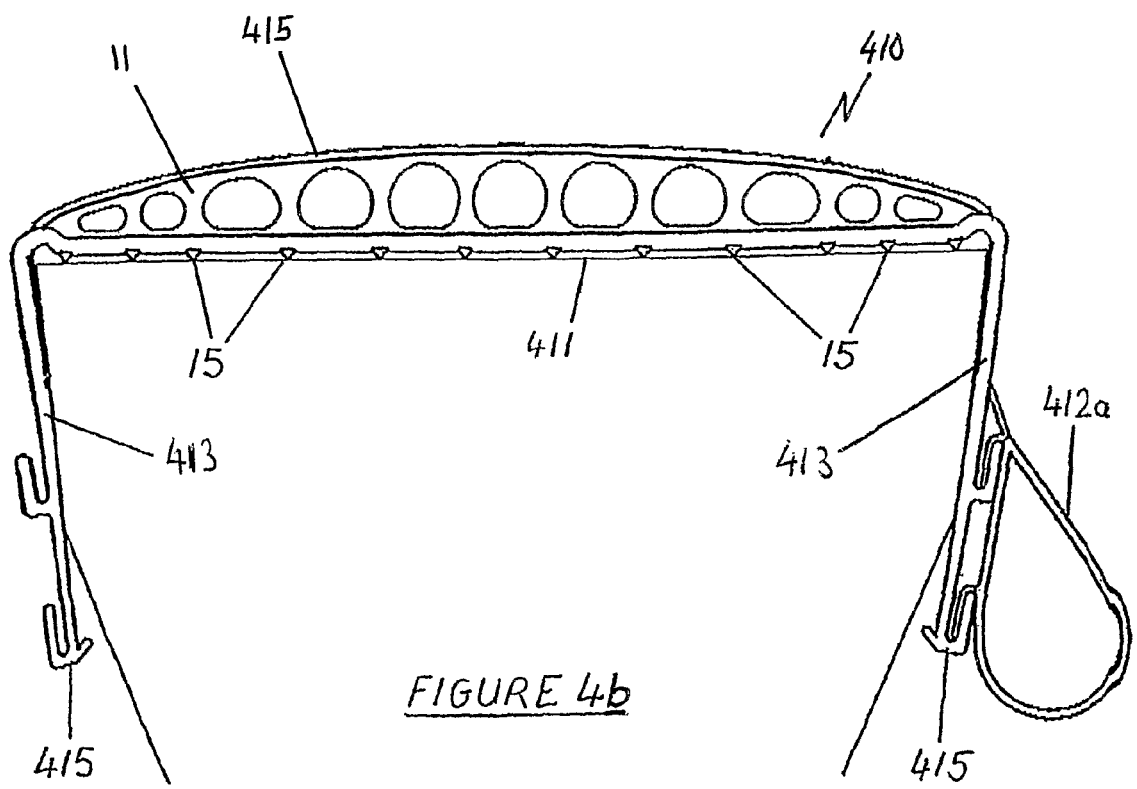
Figure 4C:
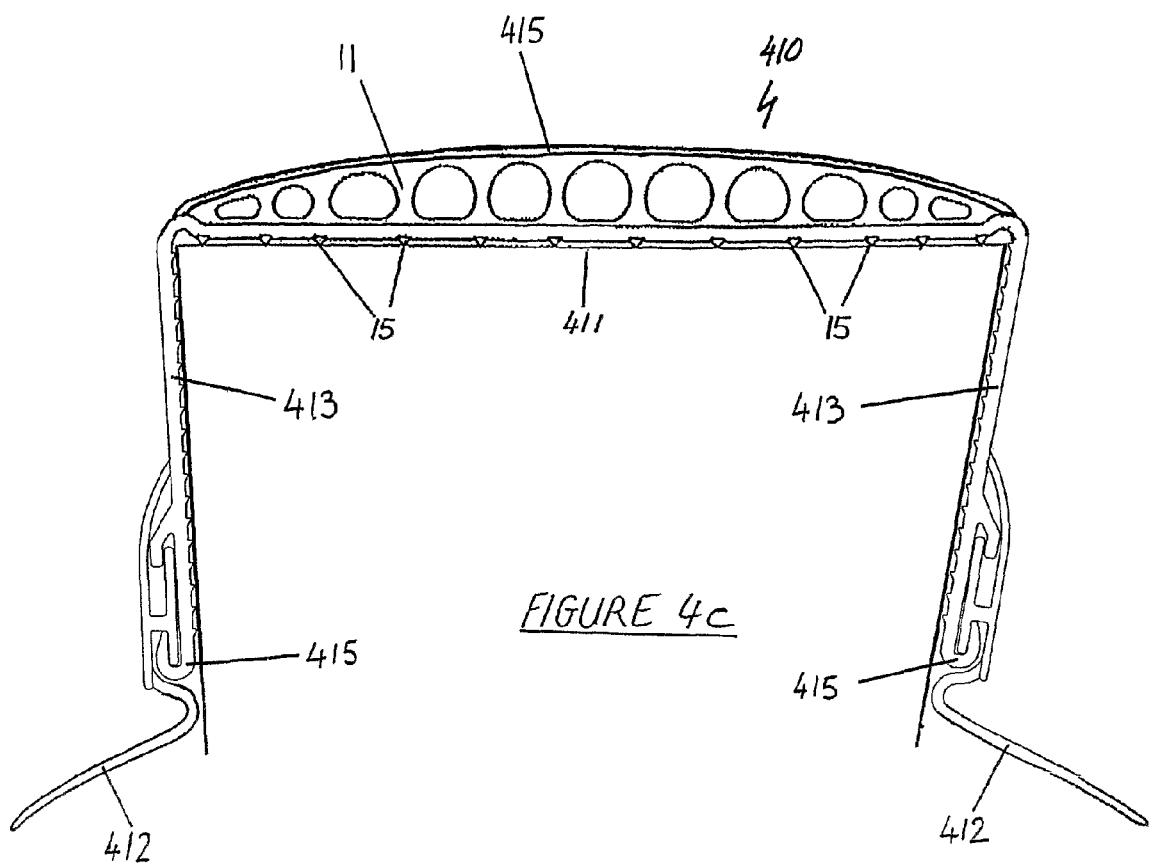

A fourth embodiment of mat 410 is shown in FIGS. 4a, 4b and 4c. Mat 410 is similar in many ways to mat 310, but differs from this mat in that it comprises of either a single flap valve 412 or a 'bubble' flap valve 412a, either of which may be supplied as a separate component and fixed to locators 415 situated on the fixing legs 413. This allows the flap to be manufactured from an alternative suitable material different from the raw material used for the mat 410 and it also allows for easy replacement of the flap valves, in the event of damage and/or wear, without having to replace the complete mat.

Figure 4D:
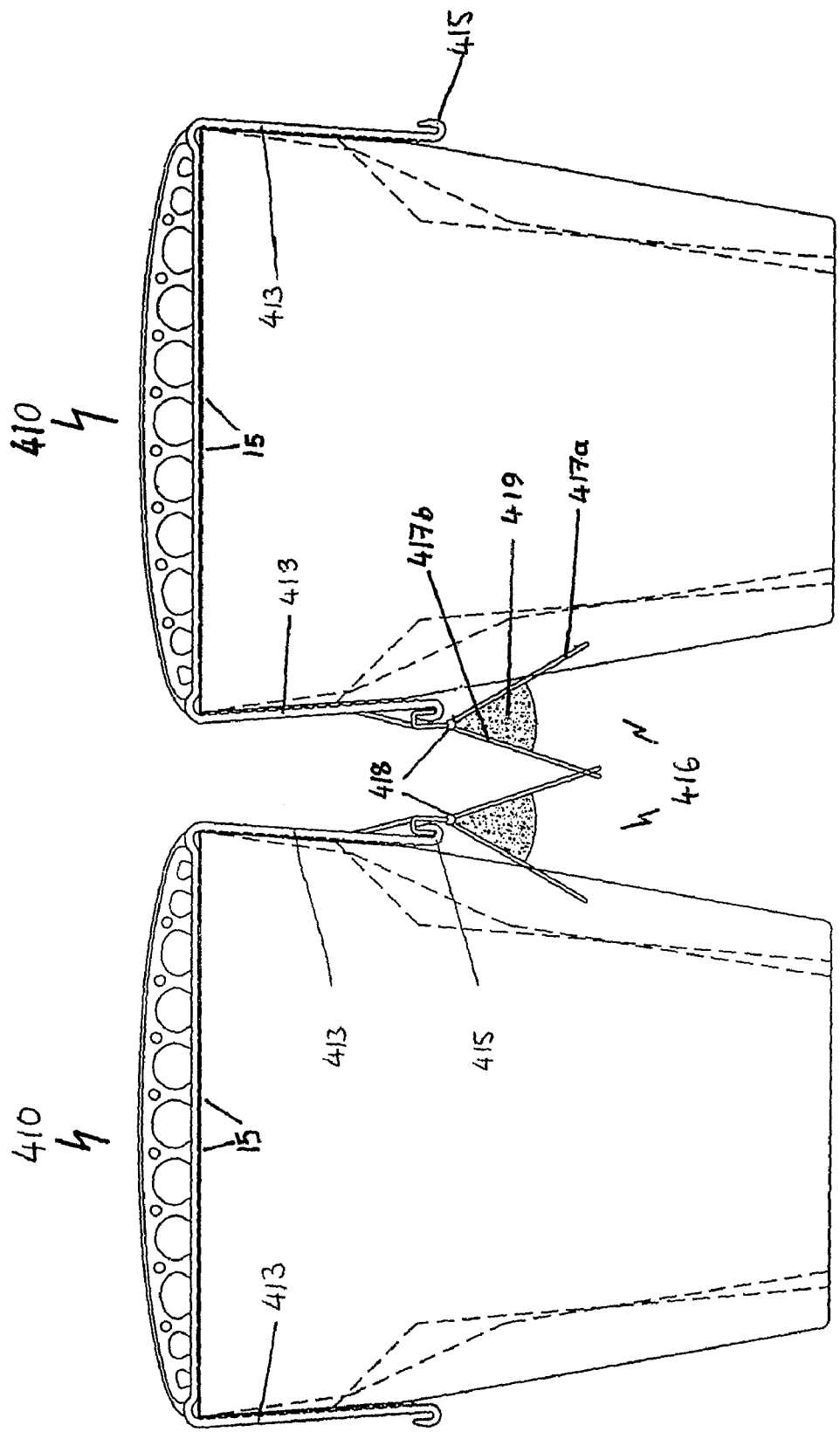
FIGS. 4d and 4e are cross-sectional side views of the mat of the fourth embodiment having flap valves which comprise a valve return mechanism.

Means may be provided for resisting the tendency of the mat to slip on the slatted floor. As shown in FIGS. 3, 4a, 4b, 4c, 4d and 4e, such anti-slip means may comprise dimples 15 formed on the undersides of the mat and legs which engage the slat. Other anti-slip formations will equally be useful and such formations may be provided with any of the embodiments of mat description herein Referring to FIGS. 4d and 4e, the legs 413 of mat of the fourth embodiment 410 are shown fitted with detachable flap valves which are provided with a valve return mechanism and are adapted to attach to locators 415 situated on fixing legs 413. In FIG. 4d, each valve 416 comprises a pair of rigid flap members 417a, 417b which are divergent from flexible joint 418 which provides a valve return mechanism that enables valve 416 to pivot thereby allowing the passage of waste material through the gap in adjacent slats. A compressible foam material 419 provided in the gap defined by divergent flap members 417a, 417b provides a further valve return mechanism which operates when a slat having a profile that interferes with the pivoting action of the valve about flexible joint 418 is used.

Figure 4E:
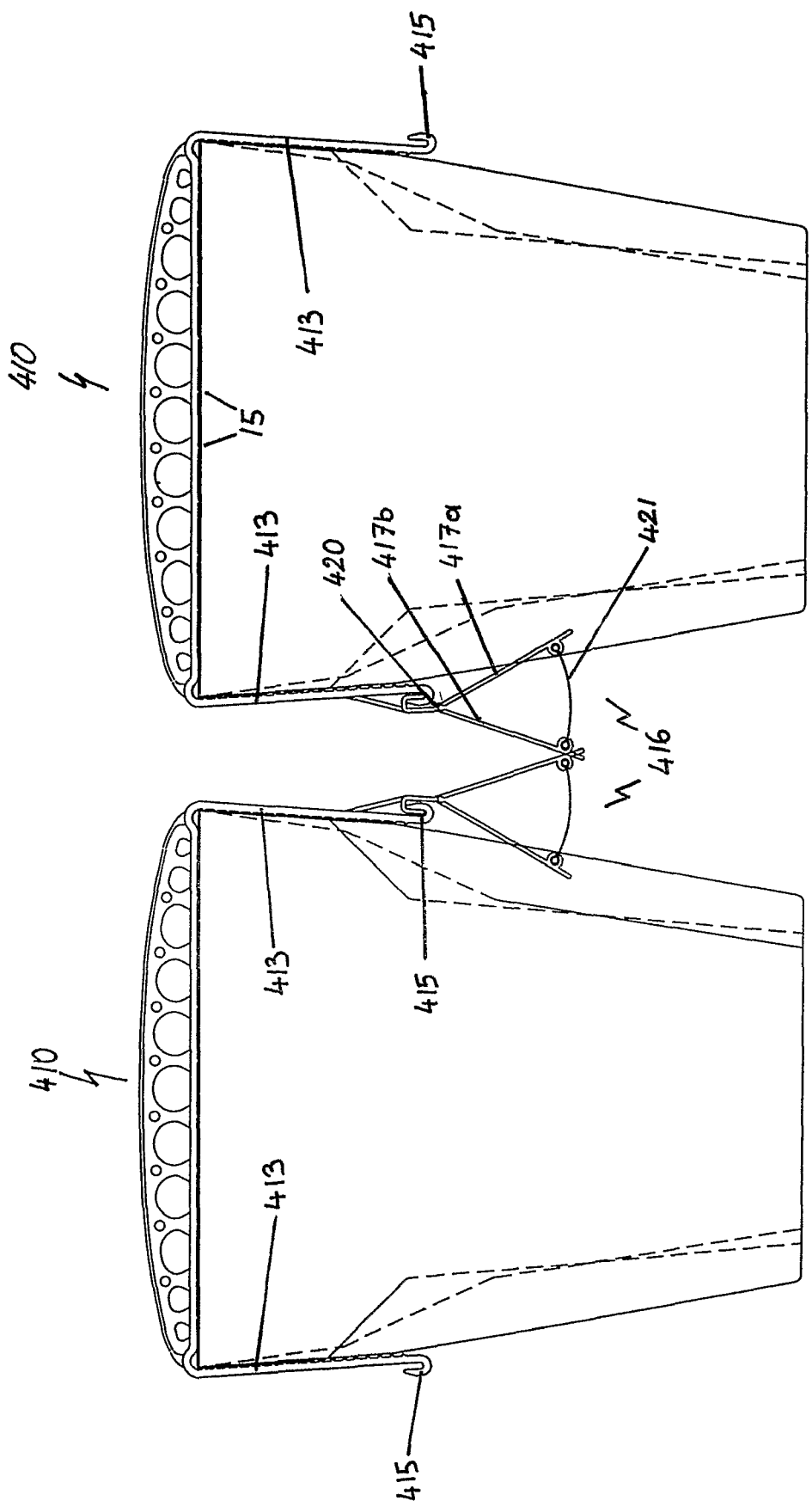

In FIG. 4e each valve 416 is shown having an alternative pivoting and valve return mechanism. In this arrangement, rigid flap members 417a, 417b are divergent from flexible hinge 420 which enables valve 416 to pivot thereby allowing the passage of waste material through the gap in adjacent slats. A spring means 421, which is provided with suitable means of attachment at its respective ends, extends between the undersides of rigid flaps 417a and 417b, respectively. The spring means 421 provides a further valve return mechanism which functions when a slat having a profile that interferes with the pivoting action of the valve about flexible joint 418 is used so that a displaced flap is returned to its normal closed position once the passage of waste material through the gap between adjacent slats is complete. Dashed lines shown in FIGS. 4d and 4e indicate schematically some exemplary alternative slat profiles.

Figure 5A:
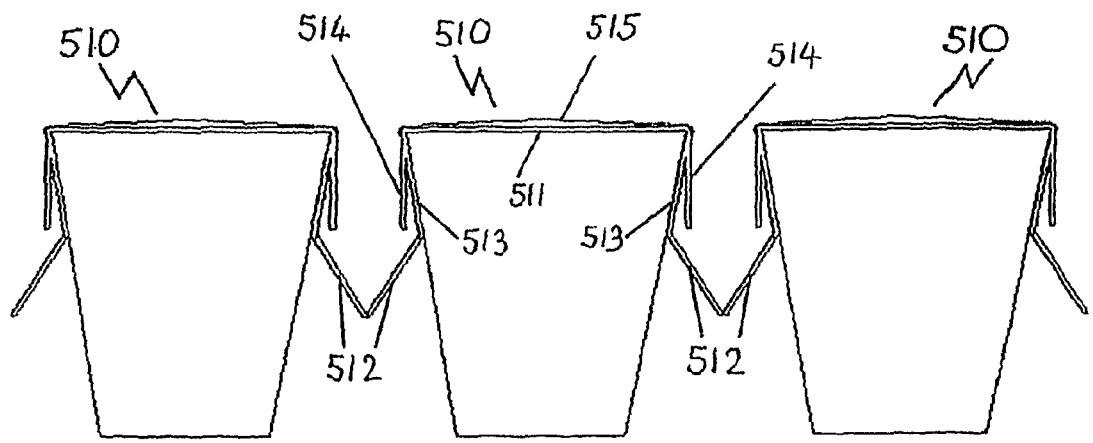
FIGS. 5a and 5b are cross-sectional views of a floor covering apparatus of a fifth embodiment showing the legs in the position that they would assume, when fitted in a grip position on the slats of a floor. The flap valves are shown as co-extruded flaps projecting from the ends of the legs (FIG. 5a) or a separate-fit or retro-fit components (FIG. 5b)
Figure 5B:
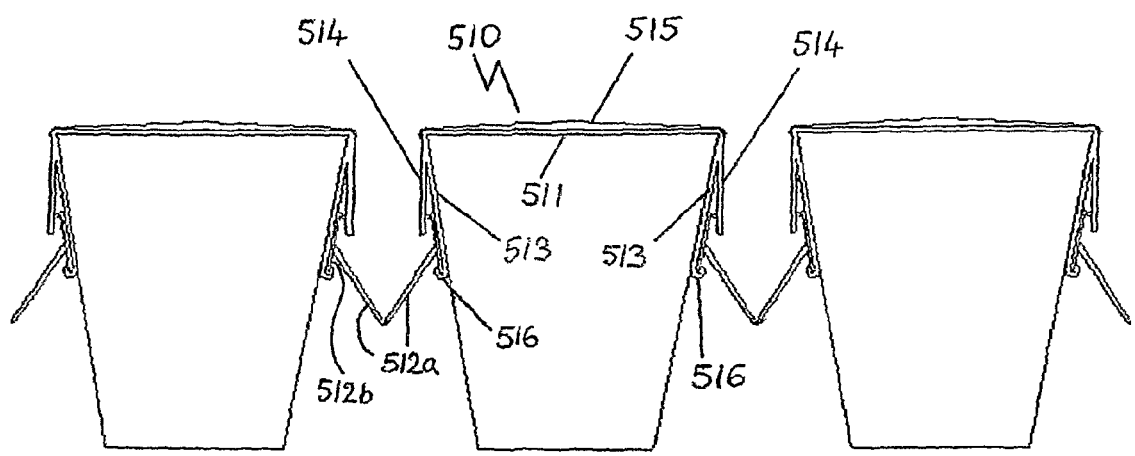

A fifth embodiment of a floor covering apparatus particularly suited, but not exclusively, to pigs is indicated generally by reference number 510, is shown in FIGS. 5a and 5b. Floor covering apparatus 510 comprises a domed elastomeric, deformable upper mat portion 515 fixed to a bed 511 of a plastics material which has sufficient rigidity to support the domed elastomeric upper mat portion 515 and sufficient resilient deformability to enable it to grip against a slat. Upper mat portion 515 is of a lower profile than the respective elastomeric, deformable mat portions of the previous embodiments and comprises a domed upper surface that curves downwardly towards the mat edges such that any urine and other animal waste matter deposited onto the floor covering apparatus 510 would tend move towards the gap between adjacent slats. Provision of such a curved upper surface may further serve to promote the movement of animal waste from the mat thereby increasing the comfort of the animals thereon and also helps preserve the slat itself by reducing absorption of urine into the concrete below.

Bed 511 includes a pair of laterally depending legs 513 formed in a shape having a natural bias to grip the sides of a slat. Each mat also comprises a further pair of downwardly extending ancillary legs 514 that are arranged at an acute angle with legs 513 such that they form a secondary flap.

In FIG. 5a, elastomeric flap valves 512 which are provided as an integral component to mat 511, extend laterally outwardly from the end of each leg 513. Two mutually adjacent flap valves 512 ideally extend to reduce the gap between two adjacent slats as shown in FIGS. 5a and 5b or alternatively, may meet in an overlapping manner.

In FIG. 5b an alternative variant of the fifth embodiment of a floor covering apparatus 510 is shown wherein rigid fixing means 516, adapted to receive a separately demountable flap valve 512, are incorporated, either by separate attachment or by co-extrusion, onto the distal ends of the laterally depending legs 513. Separately demountable flap valves 512 comprise an elastomeric flap element 512a and a base element 512b such that a flap valve 512 can be attached to depending legs 513 of the mat bed 511 with the lower edge of base element 512b fastened to fixing means 516 and the upper edge of base element 512b wedged into the space formed between the distal end of the legs 513 and the ancillary legs 514.

Referring to FIG. 5c, an alternative means of attaching a floor covering apparatus of the invention to a slat is shown. In the figure the floor covering apparatus is similar in most respects to the fifth embodiment 510 of FIGS. 5a and 5b. However the bed 511 is provided with an additional pair of spaced apart laterally depending legs 517 which are adapted to engage with elongate receiving channels 521 that are defined by member 520 which is provided integrally with slat E. Laterally depending legs 517 are provided with a plurality of angled ribs 518 so that said legs may be pressed into receiving channels 521 with an ensuing mechanical interlocking effect which helps prevent the floor covering apparatus from lifting from the slat while in use. In the Figure the floor coverings are shown having two mutually adjacent exemplary flap valves 512 extending from depending legs 513 minimize or reduce the gap between the valves.

Figure 5D:
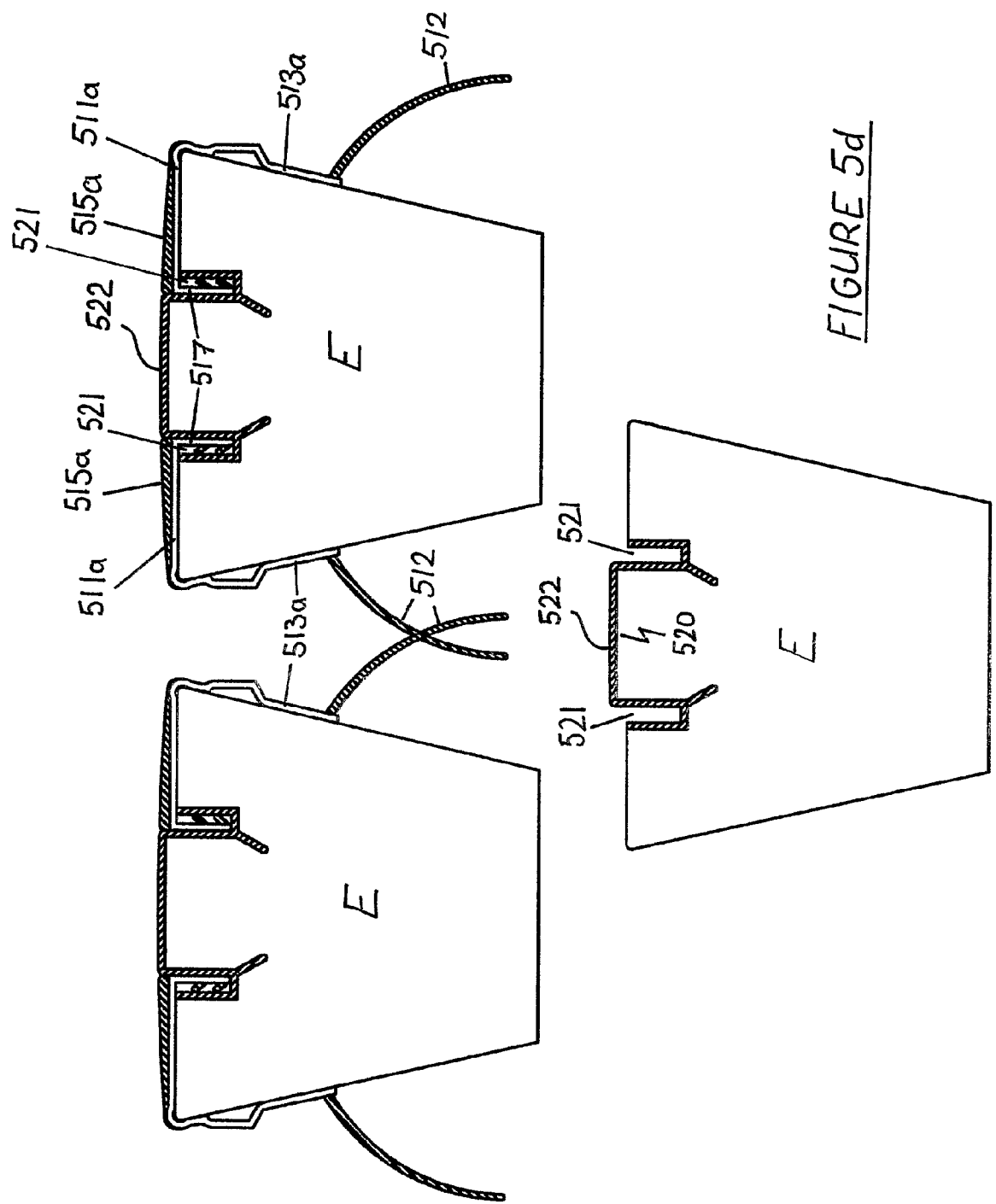

In FIG. 5d the means of attaching a floor covering apparatus of the invention to a slat is substantially the same as that of FIG. 5c. However, the floor covering apparatus is segmented into two spaced apart portions, each portion having a sloping deformable upper mat portion 515a and a fixed bed 511a which is provided with a first laterally depending leg 513a formed in a shape having a natural bias to grip the sides of a slat and a second depending leg 517 which engages with a receiving channel 521 of member 520. In this arrangement each spaced apart portion is fastened independently to an opposing side of a slat with the raised upper surface 522 of member 520 occupying the gap between said portions.

Figure 5E:
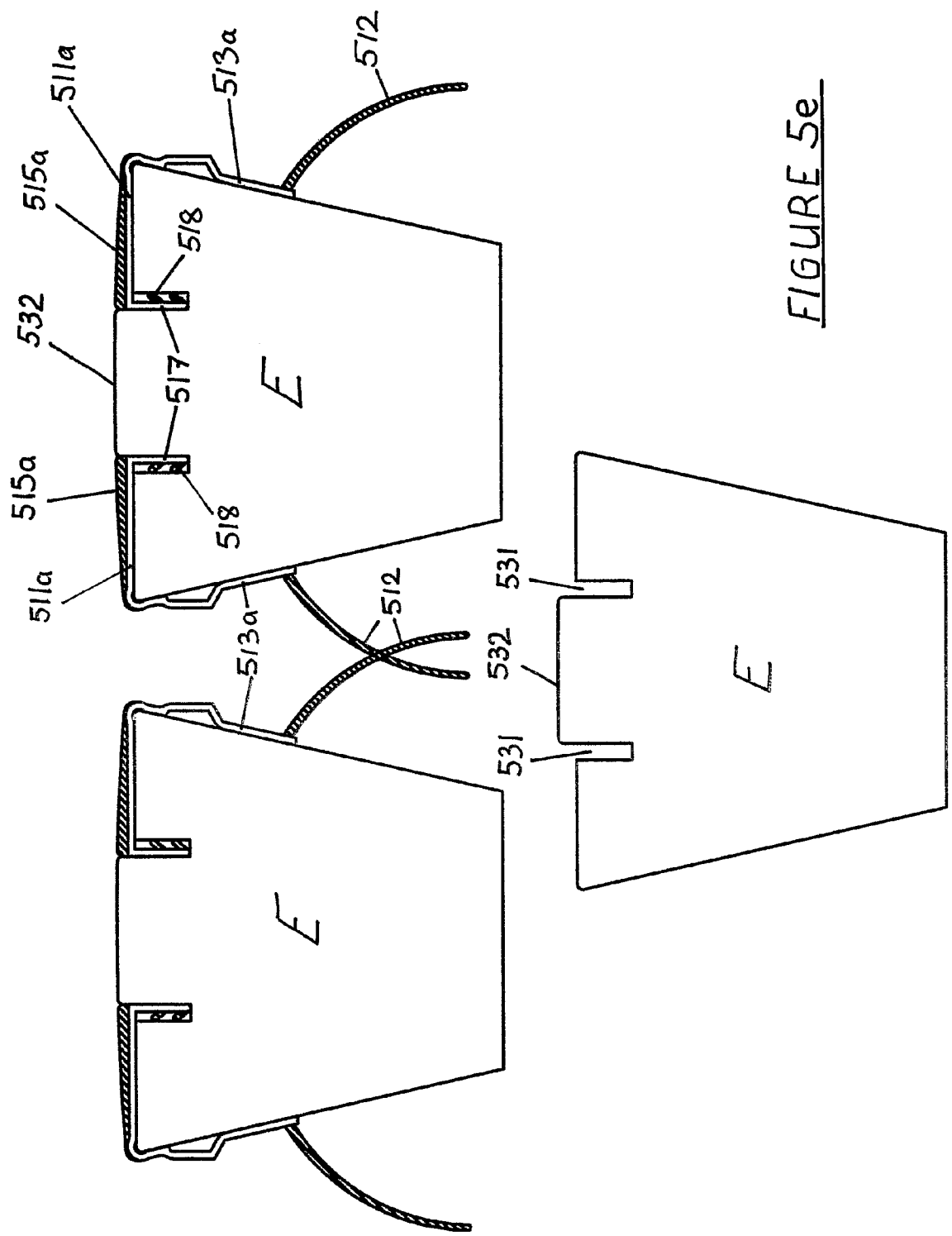

In FIG. 5e, a the segmented floor covering apparatus of FIG. 5d is shown fastened directly to a slat that is pre-formed having elongate receiving channels 531 and a raised central upper surface 532 such that the floor covering may be fastened directly to a slat without the requirement of an integrated member 520 and with raised central upper surface 532 occupying the gap between said portions.

Figure 6:
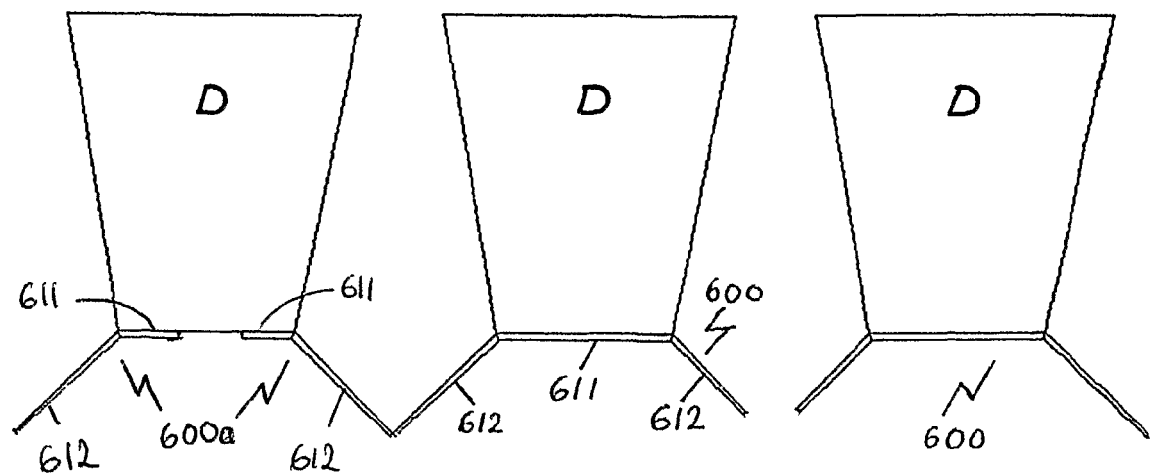
FIGS. 6a, 6b, 6c, 6d and 6e are a cross-sectional side views of an embodiment of the invention which comprises slats fitted with separately demountable flap valves.

A further embodiment of the invention comprising a separately demountable flap valve assembly 600 that is adapted to be fitted to the underside of a slat is shown in FIGS. 6a, 6b and 6c. In FIG. 6a, flap valve assembly 600 comprises an elongate bed 611 of material adapted to be fitted to the underside of a slat D by screws or other suitable means and having elastomeric flap valves 612 extending laterally outwardly from its opposing longitudinal edges. Two mutually adjacent flap valves 612 meet end to minimize or reduce the gap between two adjacent slats as shown in FIG. 6 or alternatively, may meet in an overlapping manner. In FIG. 6a a version 600a of flap valve assembly is also shown having only a single flap valve 612.

In FIG. 6b, an alternative arrangement 600b of a flap valve assembly 600 is shown having a bed 611b which is provided with downwardly dependent edges 613 from which elastomeric flap valves 612b extend initially inwardly at their respective proximal ends before curving divergently outwardly.

In FIG. 6c, a further arrangement 600c of the flap valve assembly 600b of FIG. 6b is shown having a bed 611c which is adapted to engage with a dove-tailed channel section 620 that may be incorporated into the base of a slat F as indicated in the Figure.

Figure 6D:
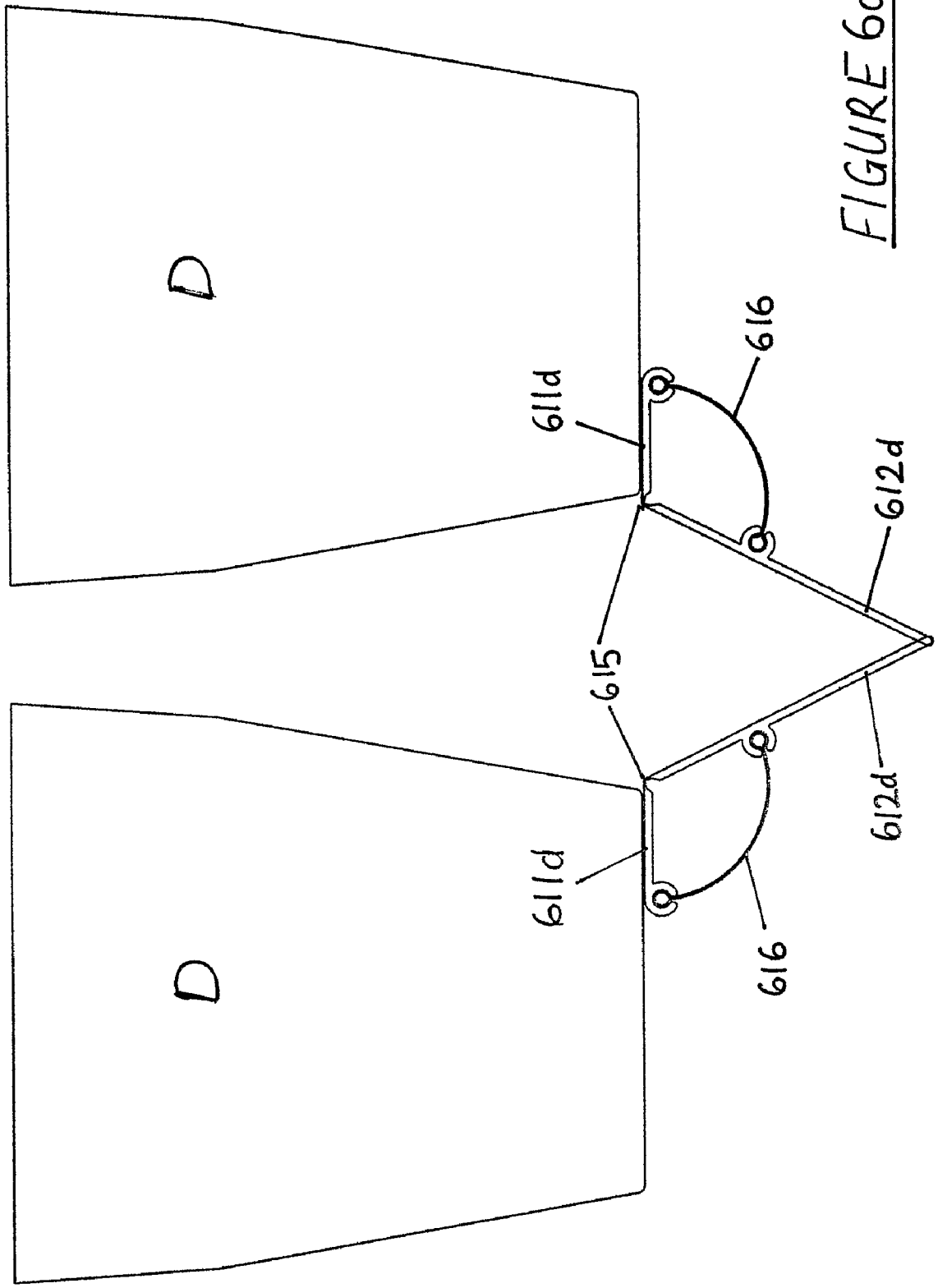

In FIG. 6d, a further alternative arrangement of a flap valve assembly 600b is shown comprising a bed 611d which is connected via a hinge 615 to a rigid flap 612d, the bed 611d being adapted to be fitted to the underside of a slat D. A spring means, shown as a flexible bow 616, provided with a suitable means of attachment at its respective ends extends between bed 611d and the underside of rigid flap 612d such that a displaced flap is returned to its normal closed position once the passage of waste material through the gap between adjacent slats is complete.

Figure 6E:
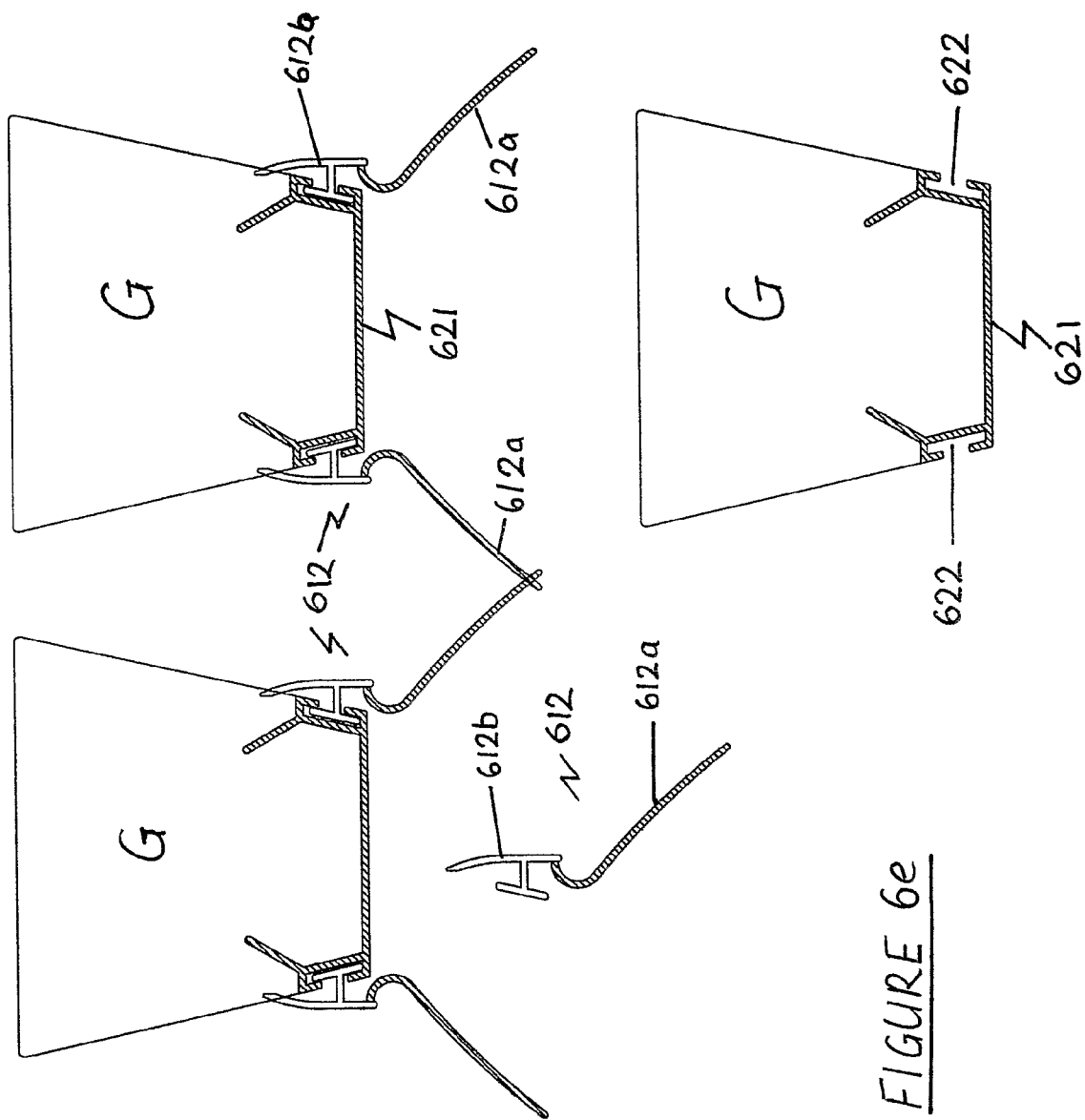

In FIG. 6e a slat G is shown having an integrated member 621 which defines a pair of spaced apart locating channels 622 on its opposing sides such that separately demountable flap valves 612 which each comprise an elastomeric flap element 612a and a mounting element 612b may be attached to the lower edges of said slat G.

Figure 7:
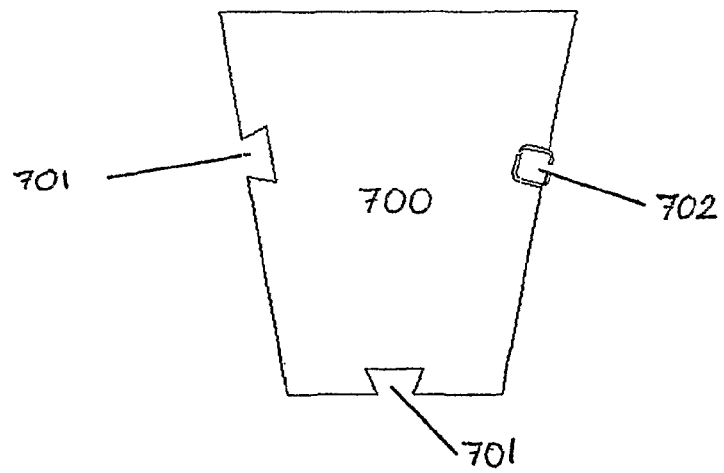
FIG. 7 shows a cross-sectional side view of a slat showing schematically alternative means of attaching separately demountable flap valves of the invention, during or after the manufacture of the slat.

FIG. 7 shows an exemplary slat 700 which can be made from concrete, metal, plastic, wood or other suitable material and which may be provided with elongate grooves 702 or channels having various shapes e.g. dove-tail 701 which may either be pre-formed or incorporated into the slat and adapted to receive complementary shaped anchoring formations provided on the respective mats or flap valves.

Figure 8A:
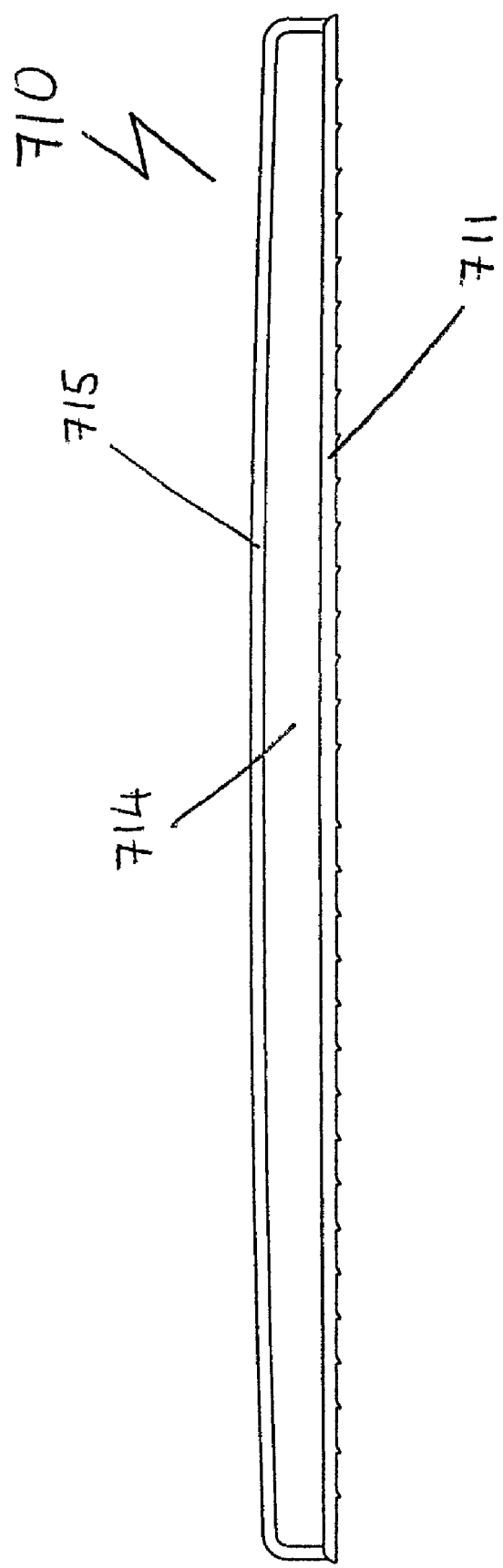
FIGS. 8a and 8b are schematic cross-sectional views of a floor covering apparatus of a sixth embodiment having a filled interior cavity.
Figure 8B:
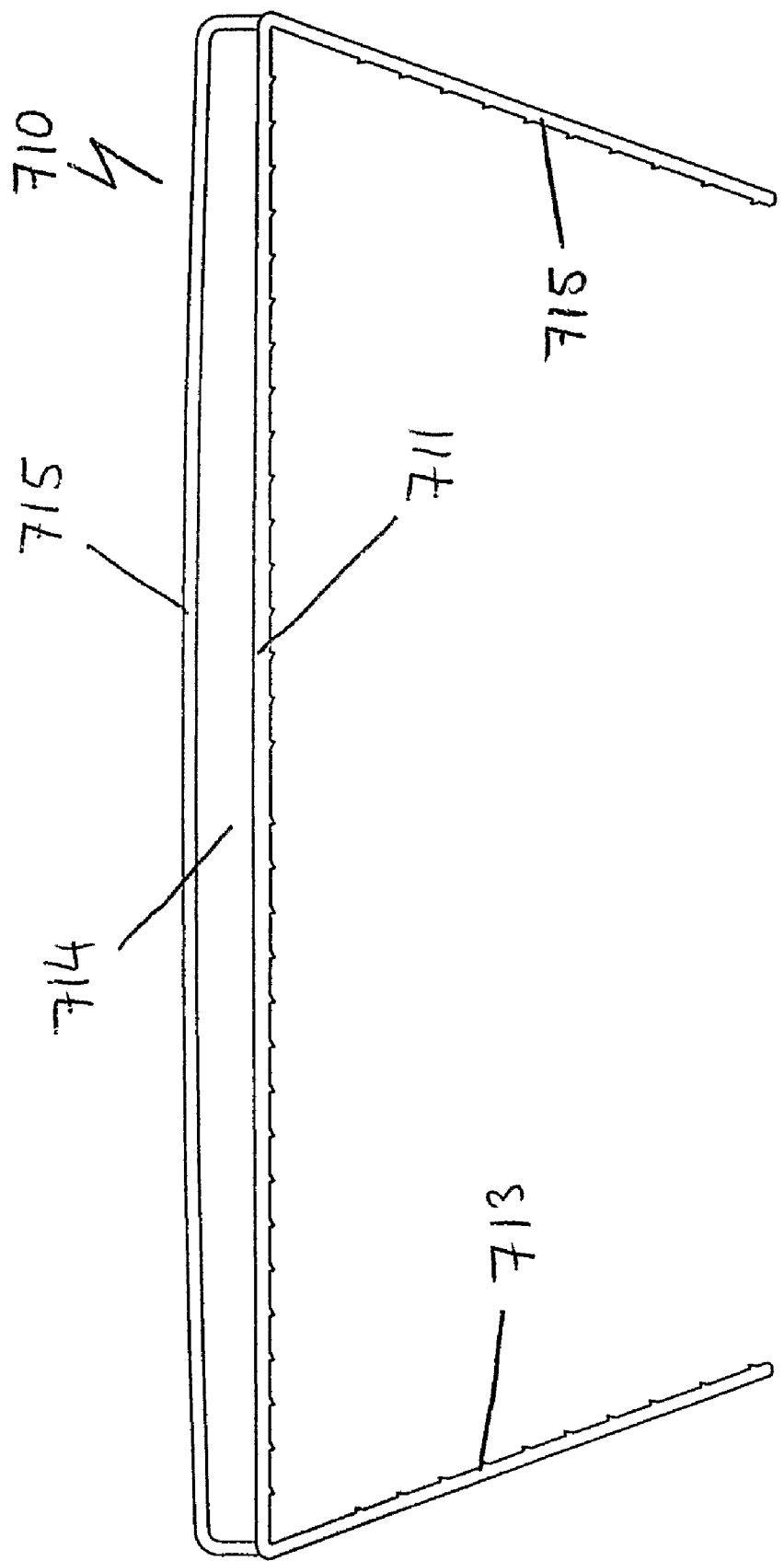

In FIGS. 8a and 8b, a sixth embodiment of a floor covering apparatus is indicated by the reference numeral 710. Floor covering apparatus 710 comprises a domed elastomeric, deformable upper mat portion 715 fixed to a bed 711 of a plastics material which has sufficient rigidity to support the domed elastomeric upper mat portion 715 and an interior cavity 714 which may be filled with a suitable deformable material. Upper mat portion 715 is of a lower profile than the respective elastomeric, deformable mat portions of the previous embodiments and comprises a domed upper surface that curves downwardly towards the mat edges such that any urine and other animal waste matter deposited onto the floor covering apparatus 710 would tend move towards the gap between adjacent slats. Provision of such a curved upper surface may further serve to promote the movement of animal waste from the mat thereby increasing the comfort of the animals thereon and also helps preserve the slat itself by reducing absorption of urine into the concrete below. In FIG. 8b, an alternative arrangement of floor covering apparatus 710 comprises a bed 711 which includes a pair of laterally depending legs 713 formed in a shape having a natural bias to grip the sides of a slat.

Figure 9:
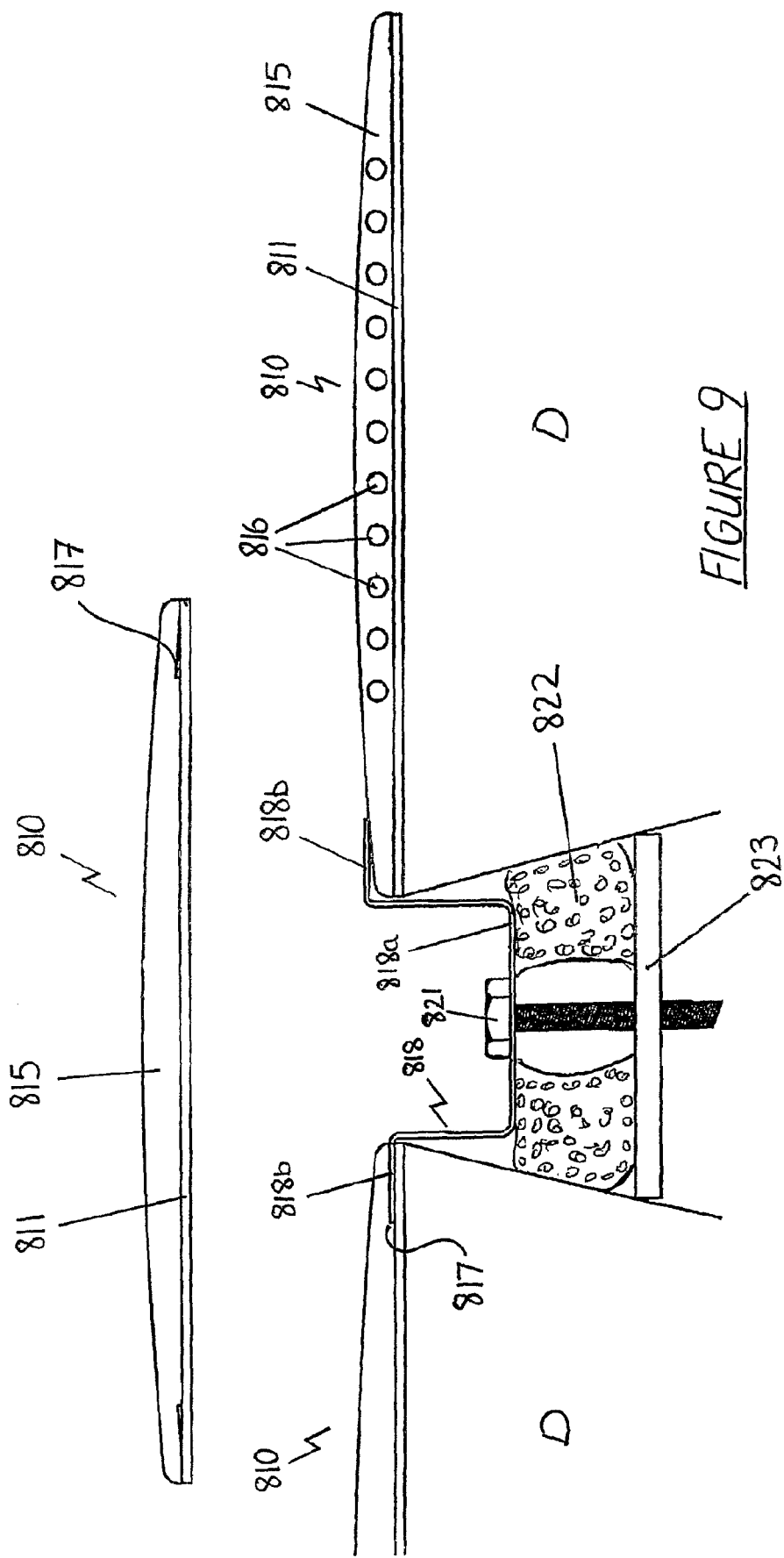
FIG. 9 is a schematic cross-sectional view of a floor covering apparatus of a seventh embodiment and means of connection to a slat.

In FIG. 9, a seventh embodiment of a floor covering apparatus is indicated by the reference numeral 810. Floor covering apparatus 810 comprises a domed elastomeric, deformable upper mat portion 815 fixed to a bed 811 of a plastics material which has sufficient rigidity to support the domed elastomeric upper mat portion 815 which may either be of solid construction or provided with a plurality of elongate holes 816. A bracket 818 which comprises a lower part 818a and flanges 818b extends into the gap between adjacent slats D is adapted to engage the respective edges of adjacent mats 810. Attachment of bracket 818a to mats 810 may be either with flanges 818b engaging with recesses 817 provided along the edges of mats 810 or with flanges 818b in contact with the surface of the outermost edges of mat upper portion 815. Upon tightening bolt 821 which extends through bracket 818 and expansion ring 822 into captive member 821 which is wedged between the respective sloping sides of slats D, bracket 818 is forced downwards thereby clamping mats 810 to slats D.

Further enhancements may be made to any of the aforementioned embodiments of the floor covering apparatus to augment the performance of the mats and their respective flap valves as well to as improve the comfort and safety afforded to the livestock residing thereon. Mats, 10, 110, 310, 410, 515, 715 and 810 are each suitable to receive surface treatments that would include textured embossing or the addition of a further non-slip grip surface made from a material applied either in the form of a complete skin or in the form of beads or other similar textured features. The inclusion of such surface treatments would also contribute to improved durability. The use of resilient elastomeric materials in the construction of the flap valves allows the barrier formed by the valves to return to its original closed position once urine and other waste materials have passed through the floor slats so that gases and odours from a slurry tank below are prevented from ascending upwardly though the barrier into the animal housing or reduced considerably. Furthermore, employing elastomeric materials having a low friction surface finish increases the transfer rate of said animal waste across said flap valves and into a slurry tank or similar holding container below.

It is to be understood that the invention is not limited to the specific details described herein which are given by way of example only and that various modifications and alterations are possible without departing from the scope of the invention as defined in the appended claims.

What is claimed is:

1. A floor covering apparatus for placement on at least one floor slat of a slatted floor in an animal house for housing animals, the floor slat being a narrow elongate support structure, the floor covering apparatus comprising:
    an elongated elastomeric mat adapted to be fitted to at least one floor slat, the mat having
        a rigid fixing base,
        a flexible core of deformable material providing cushioning support for animals thereon, and
        an outer skin having a curved upper surface promoting the movement of animal urine and feces off the elongated elastomeric mat, with the rigid fixing base, the flexible core and the outer skin being discrete from one another and formed together as a unitary structure, the rigid fixing base including a leg at each longitudinal side of the mat, each leg extending from the rigid fixing base away from the mat, wherein each leg is resiliently biased toward the other of the legs to grip an outermost side of the floor slat, wherein the rigid fixing base and the outer skin form a cavity there between, the flexible core being encapsulated within the cavity, the outer skin including two lateral side walls that are continuous with and extend from the curved upper surface, the lateral sides walls flanking the curved upper surface, a full extent of the lateral side walls being exposed to permit the movement of animal urine and feces thereon to a slurry collection tank beneath the slatted floor and to reduce the retention of such materials on the mat.

2. A floor covering apparatus as claimed in claim 1, each leg being adapted to extend into the gap between adjacent slats, the two legs of each mat serving to locate the mat.

3. A floor covering apparatus as recited in claim 1, in which at least one of the legs is provided with gripping means to facilitate the gripping of the mat to the floor slat.

4. A floor covering apparatus as recited in claim 1, in which the lateral side walls extend substantially parallel to one another from the curved upper surface to the rigid fixing base.

5. A floor covering apparatus as recited in claim 1, in which the mat has a surface which reduces or substantially reduces urine absorption into the slats.

6. A floor covering apparatus as recited in claim 1, in which the rigid fixing base of the mat includes a non-slip grip surface forming at least one of textured embossing and beads protruding from the rigid fixing base for removeably engaging the floor slat when placed thereon.

7. A floor covering apparatus as recited in claim 1, in which the mat is sized to match the profile of the individual slats and has a surface which permits the transfer of animal waste to a collection tank beneath the slatted floor, thereby improving the animal cleanliness and reducing the amount of material that may cause gaseous emissions such as ammonia that otherwise would be retained on the slat.

8. A floor covering apparatus as claimed in claim 1, wherein each leg of the mat has one or more elbows along its length to facilitate the gripping of the mat to the slat.

9. A floor covering apparatus as claimed in claim 1, in which a flap valve is provided at one or both sides of the slat mat, the flap valve or valves being adapted to protrude into the gap between adjacent slats.

10. A floor covering apparatus as claimed in claim 9, in which the flap valve or valves is or are provided with a movement joint, whereby pressure on the upper surface of the mat by an animal standing or moving thereon allows the flap valve to flex and move in the gap between the slats to permit animal waste to fall into a waste collection tank located underneath the slatted floor.

11. A floor covering apparatus as claimed in claim 10, in which flap valves are provided on each side of adjacent slats so that the gap in the opening between adjacent slats is reduced by meeting, overlapping or coming into proximity with each other.

12. A floor covering apparatus as claimed in claim 9, in which the flap valve is transversely cut along its length at intervals, so as to provide separate sections each of which may move separately.

13. A floor covering apparatus as claimed in claim 9, in which a flap valve is provided at one or both sides of the slat mat, the valve being adapted to protrude into the gap between adjacent slats at a level below the floor, whereby the flap valve rests below the floor surface and therefore is less likely to be damaged by the hooves or bodies of animals as they move about on the floor.

14. A floor covering apparatus as claimed in claim 9, in which the flap valve is selected from the group comprising a single flap, a multiple flap, a bubble valve with a single chamber and a bubble valve with a multiple chamber.

15. A floor covering apparatus as claimed in claim 14, in which the flap valve is provided as an integral component of the mat.

16. A floor covering apparatus as claimed in claim 14, in which the flap valve is provided as a separate component to be fixed to one of the legs on a location provided on the mat, whereby the flaps may be replaced without necessitating the replacement of the complete mat.

17. A floor covering apparatus as claimed in claim 1, in which the mat is provided with formations located on one or more of its surfaces which, in use, are in contact with a slat, whereby said formations are adapted to resist slippage of the mat relative to the slat.

18. A floor covering apparatus as recited in claim 1, wherein the flexible core fills the cavity.

19. A floor covering apparatus as recited in claim 1, in which the flexible core and the outer skin are both directly in contact with and supported by the rigid fixing base.

20. A floor covering apparatus as recited in claim 1, in which the legs are formed integrally with the rigid fixing base.

21. A floor covering apparatus as recited in claim 1, in which each leg is at least 10 mm in length.

22. A floor covering apparatus as recited in claim 1, wherein the flexible core includes a series of chambers.

* * * * *